(12) United States Patent
Pastore et al.

(10) Patent No.: US 10,801,898 B2
(45) Date of Patent: Oct. 13, 2020

(54) TEMPERATURE PROBE FOR DOMESTIC OVEN AND DOMESTIC OVEN USING SUCH PROBE

(71) Applicant: WHIRLPOOL CORPORATION, Benton Harbor, MI (US)

(72) Inventors: Cristiano Vito Pastore, Comerio (IT); Marco Giuliani, Comerio (IT); Giulio Ghiglieri, Comerio (IT); Riccardo Nava, Comerio (IT)

(73) Assignee: Whirlpool Corporation, Benton Harbor, MI (US)

( * ) Notice: Subject to any disclaimer, the term of this patent is extended or adjusted under 35 U.S.C. 154(b) by 311 days.

(21) Appl. No.: 15/821,354

(22) Filed: Nov. 22, 2017

(65) Prior Publication Data
US 2018/0143083 A1 May 24, 2018

(30) Foreign Application Priority Data
Nov. 22, 2016 (EP) ...................................... 16200123

(51) Int. Cl.
*G01K 1/14* (2006.01)
*G01K 7/02* (2006.01)
*G01K 1/08* (2006.01)
*G01K 13/00* (2006.01)
(52) U.S. Cl.
CPC ................. *G01K 1/14* (2013.01); *G01K 1/08* (2013.01); *G01K 7/023* (2013.01); *G01K 13/00* (2013.01); *G01K 2207/06* (2013.01)

(58) Field of Classification Search
CPC ............ G01K 1/14; G01K 1/08; G01K 7/023; G01K 13/00; G01K 2207/06; G01K 2207/00; G01K 2207/02
See application file for complete search history.

(56) References Cited

U.S. PATENT DOCUMENTS

| 2,657,580 | A | * | 11/1953 | Schroeder | G01K 7/34 374/183 |
| 2,988,717 | A | | 6/1961 | Bergsma | |
| 3,241,370 | A | | 3/1966 | Mertler et al. | |
| 3,931,620 | A | | 1/1976 | Wellman, Jr. et al. | |
| 3,975,720 | A | * | 8/1976 | Chen | F24C 7/02 219/712 |
| 4,077,690 | A | * | 3/1978 | Koether | G01K 7/023 439/320 |
| 4,122,322 | A | | 10/1978 | Ohkubo et al. | |
| 4,458,140 | A | | 7/1984 | Belinkoff | |
| 4,460,814 | A | | 7/1984 | Diesch et al. | |

(Continued)

FOREIGN PATENT DOCUMENTS

DE 3104926 A1 8/1982
DE 3119496 A1 12/1982
(Continued)

*Primary Examiner* — Nathaniel T Woodward
*Assistant Examiner* — Philip L Cotey
(74) *Attorney, Agent, or Firm* — Price Heneveld LLP

(57) ABSTRACT

A temperature probe is configured to be used in a domestic oven and comprises a sensing portion for inserting into food during cooking and a cable for coupling the sensing portion to a control unit of the oven. The cable is semi-rigid so that it is configured for self-supporting the sensing portion of the probe.

17 Claims, 2 Drawing Sheets

(56) References Cited

U.S. PATENT DOCUMENTS

| | | | | |
|---|---|---|---|---|
| 5,342,126 | A * | 8/1994 | Heston | G01K 1/14 |
| | | | | 24/DIG. 53 |
| 5,893,996 | A * | 4/1999 | Gross | H05B 3/746 |
| | | | | 219/447.1 |
| 2005/0072490 | A1* | 4/2005 | Baber | B25F 5/021 |
| | | | | 144/136.95 |
| 2008/0223498 | A1* | 9/2008 | Bertini | G06F 17/5018 |
| | | | | 156/48 |
| 2015/0168232 | A1* | 6/2015 | Chu | G01K 13/00 |
| | | | | 374/208 |
| 2016/0152794 | A1* | 6/2016 | Diaham | C08K 3/38 |
| | | | | 428/220 |
| 2016/0341607 | A1* | 11/2016 | Swayne | G01K 1/02 |
| 2017/0205294 | A1* | 7/2017 | Yoshida | G01K 7/02 |

FOREIGN PATENT DOCUMENTS

| | | |
|---|---|---|
| DE | 102006048753 A1 | 4/2008 |
| EP | 1271061 A2 | 1/2003 |
| JP | 2010151733 A | 7/2010 |

* cited by examiner

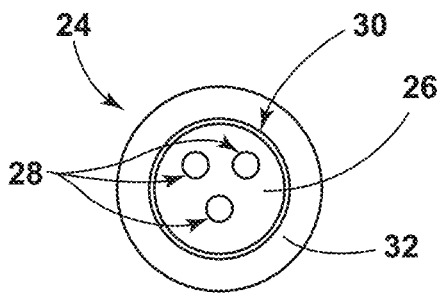
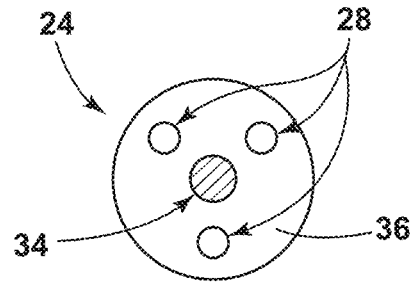
FIG. 3          FIG. 4
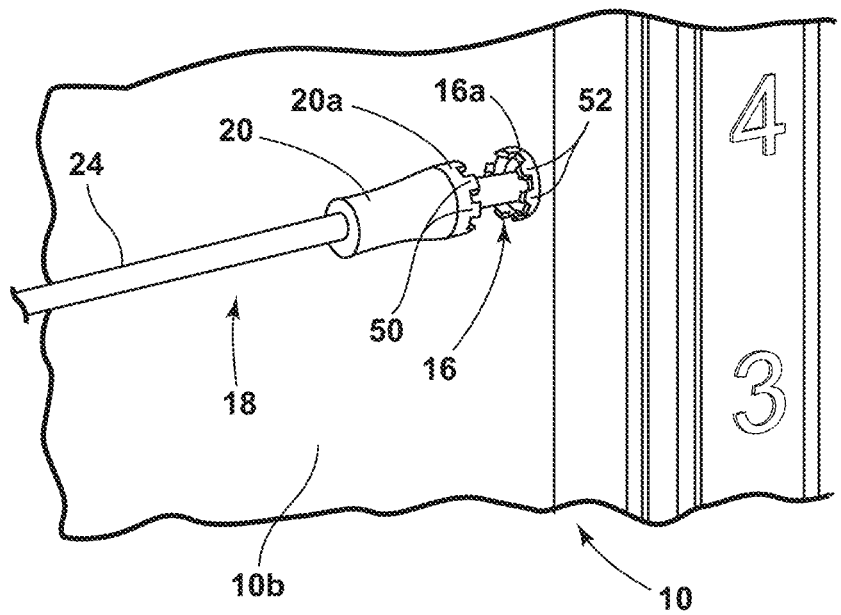
FIG. 5
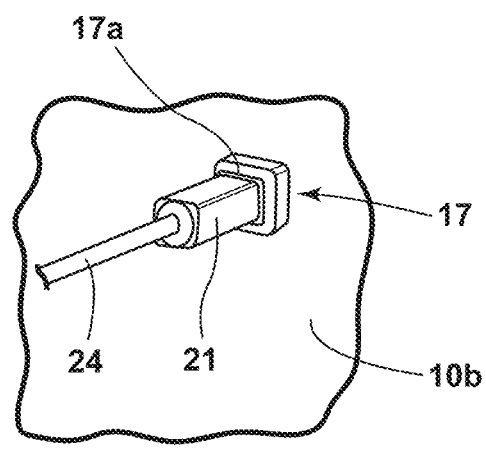
FIG. 6

TEMPERATURE PROBE FOR DOMESTIC OVEN AND DOMESTIC OVEN USING SUCH PROBE

CROSS-REFERENCE TO RELATED APPLICATION(S)

This application claims priority to E.P. Application No. EP16200123.4, filed on Nov. 22, 2016, entitled "TEMPERATURE PROBE FOR DOMESTIC OVEN AND DOMESTIC OVEN USING SUCH PROBE," the disclosure of which is hereby incorporated herein by reference in its entirety.

FIELD

The present invention relates to a thermometer probe configured to be used in a domestic oven and comprising a sensing portion for inserting into food during cooking and a cable for coupling the sensing portion to a control unit of the oven. It relates to a domestic oven comprising the above thermometer probe as well.

BACKGROUND

Temperature probes for monitoring food temperature being cooked or baked in convection ovens have been known for many decades.

U.S. Pat. Nos. 2,657,580, 2,988,717, 3,241,370, 3,931,620, 4,077,690, 4,122,322, 4,458,140 and US2015/0168232A1 disclose temperature probes including a penetrating portion for inserting into the food and a flexible cable for coupling the penetrating portion to a control process unit of the oven.

One of the problems associated with such known probes is twofold. On one hand, the measurement accuracy depends on correctly positioning the probe within the food and, on the other hand, it is difficult to keep the probe itself in a correct and stable position throughout the cooking process. In particular, when the known temperature probes are used in conjunction with soft foods or raising foods, such as bread loafs, cakes and soufflés, they fail because the probe sensing portion (tip) tends to move away from the ideal position, leading to unstable temperature readings. In some cases the probe may eventually fall out of the food, thus leading to completely unreliable measurements. For that reason, the use of the temperature probes is currently limited to just meats and fish whose stiffness keeps the probe in place throughout the entire cooking process.

Currently there are few examples of external fixtures provided to support the probe. An example of such a fixture can be found in professional ovens from RATIONAL, where the support comes in the form of an additional tool fixed to lateral grids onto which the probe is fixed. This solution is quite complex and it adds a further component for supporting a traditional temperature probe with a flexible cable.

Other improved food probes have been disclosed by DE3104926 and DE3119496 in order to ensure a correct positioning of the probe inside the food. Those probes have means to inform the user about an incorrect probe positioning. However those probes have no means for ensuring that the correct position is maintained throughout the course of the cooking process.

EP1271061-A2 discloses a support arrangement adapted to engage the core temperature probe and means to determine whether, during a phase of a cooking cycle, the core temperature probe is inserted in a pre-defined manner in the food being cooked.

SUMMARY

It is therefore an object of the present disclosure to extend the range of application of a temperature probe to other food categories which don't have enough stiffness to support the weight of the sensing portion of the probe such as rising food (bread, cakes), salty cakes, soups, soufflés, etc.

Another object of the present disclosure is to achieve the purpose of keeping the probe in place, without using any external fixture.

These objects are reached thanks to the features listed in the appended claims.

In at least one aspect, a temperature probe is configured to be used in a domestic oven. The temperature probe includes a sensing portion for inserting into food during cooking and a cable for coupling the sensing portion to a control unit of the oven, characterized in that said cable is configured for self-supporting the sensing portion of the probe.

Embodiments of a first aspect of the disclosure can include any one or a combination of the following features:
- the cable comprises electric wires embedded in an insulation polymeric matrix enclosed in a metallic flexible sheath.
- the cable comprises at least one semi-rigid, plastically-deformable metal core embedded in an insulation polymeric matrix which also embeds electric wires.
- the cable is coated with a polymeric, temperature resistant material preferably silicone rubber or the like.
- the cable presents a connector configured to be coupled to a corresponding socket provided in a wall of the oven, means being provided for preventing a rotation of the cable when coupled to the socket.
- the means for preventing rotation of the cable comprise a first crown-shaped element coaxially fastened to or integral with the socket and a second crown-shaped element coaxially fastened to or integral with the connector, such crown-shaped elements cooperating with each other for maintaining a predetermined position of the connector and cable.
- the means for preventing rotation of the cable comprise a connector having a prismatic shape corresponding to the shape of an aperture of a socket.

In at least another aspect, a domestic oven has a temperature probe. The temperature probe includes a sensing portion for inserting into food during cooking and a cable for coupling the sensing portion to a control unit of the oven, characterized in that said cable is configured for self-supporting the sensing portion of the probe.

Embodiments of a second aspect of the disclosure can include any one or a combination of the following features:
- the cable presents a connector configured to be coupled to a corresponding socket provided in a wall of the oven, means being provided for preventing a rotation of the cable when coupled to the socket.
- said means for preventing rotation of the cable comprise a first crown-shaped element coaxially fastened to or integral with the socket and a second crown-shaped element coaxially fastened to or integral with the connector, such crown-shaped elements cooperating with each other for maintaining a predetermined position of the connector and cable.

said means for preventing rotation of the cable comprise a connector having a prismatic shape corresponding to the shape of an aperture of a socket.

the cable comprises electric wires embedded in an insulation polymeric matrix enclosed in a metallic flexible sheath.

the cable comprises at least one semi-rigid, plastically-deformable metal core embedded in an insulation polymeric matrix which also embeds electric wires.

the cable is coated with a polymeric, temperature resistant material preferably silicone rubber or the like.

In at least another aspect, a method of sensing food temperature in an oven is provided. The method includes providing a temperature probe comprising a sensing portion for inserting into food during cooking and a cable for coupling the sensing portion to a control unit of the oven, characterized in that said cable is configured for self-supporting the sensing portion of the probe and inserting the temperature probe into a food positioned in the oven.

Embodiments of a third aspect of the disclosure can include any one or a combination of the following features:

coupling a connector configured to be coupled to a corresponding socket to the cable where the connector is provided in a wall of the oven, means being provided for preventing a rotation of the cable when coupled to the socket.

the cable is coated with a polymeric, temperature resistant material preferably silicone rubber or the like.

the cable comprises electric wires embedded in an insulation polymeric matrix enclosed in a metallic flexible sheath.

These and other features, advantages, and objects of the present device will be further understood and appreciated by those skilled in the art upon studying the following specification, claims, and appended drawings.

BRIEF DESCRIPTION OF THE DRAWINGS

Further advantages and features of a temperature probe and oven according to the invention will become clear from the following detailed description, with reference to the attached drawings in which:

FIG. 3 is a section view of the semi-rigid cable of a temperature probe according to the invention, in a first embodiment thereof;

FIG. 4 is a section view of the semi-rigid cable of a temperature probe according to the invention, in a second embodiment thereof;

FIG. 5 is a perspective view of a detail of the way in which the temperature probe is connected to a socket in the wall of the oven, and FIG. 6 is a perspective view similar to FIG. 5 and according to a further embodiment of the invention.

DETAILED DESCRIPTION OF EMBODIMENTS

Figure 1:
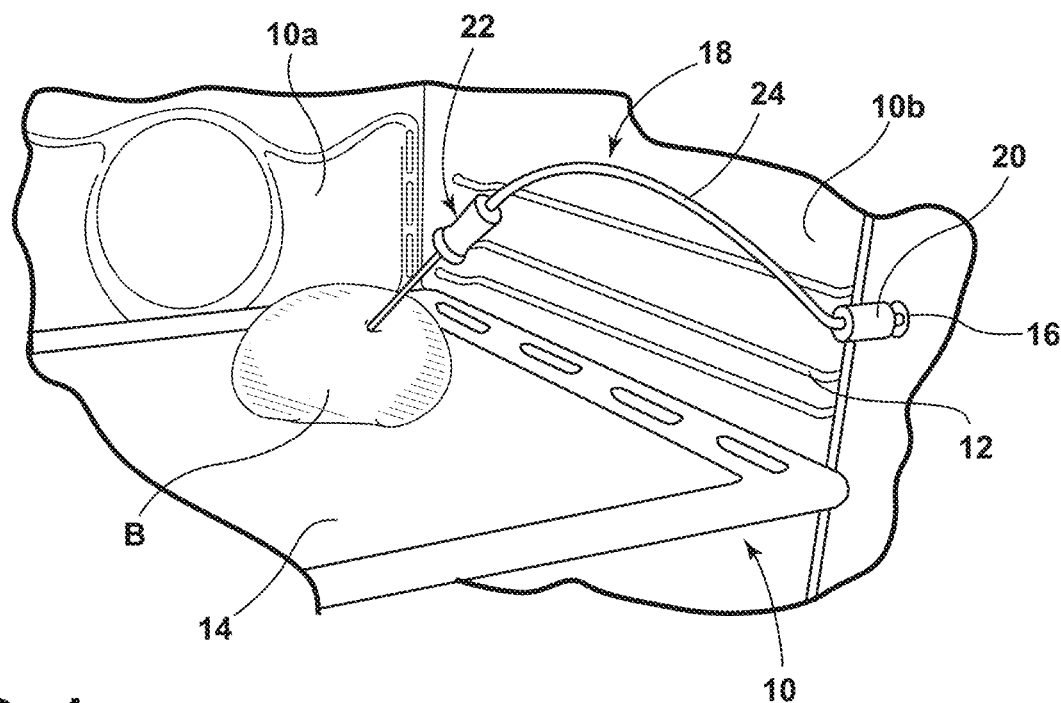
FIG. 1 is a partial perspective view of an oven according to the invention.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary.

It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-6, reference numeral 18 generally designates a temperature probe. The temperature probe 18 is configured to be used in a domestic oven and includes a sensing portion 22 for inserting into food during cooking and a cable 24 for coupling the sensing portion 22 to a control unit of the oven, characterized in that said cable 24 is configured for self-supporting the sensing portion 22 of the probe 18.

The solution according to the present disclosure is a self supporting probe, preferably provided with a semi-rigid cable and a special connector plugging in a mating receptacle located in one of the oven inner walls.

One of the advantages of having the semi-rigid cable is in the ability to adjust the probe in a position of choice with respect to the food, without the need of external fixtures. By bending the cable in a proper way, the probe sensing portion or tip will be able to reach and stand still to every location of the food even when the food is soft or even in a liquid state. The probe will maintain its position even during the rising of food (for instance when bread is cooked), and in this way it is possible to have continuous and stable temperature measurement and the consequent excellent control of food readiness.

The semi-rigid cable 24 might be preferably coated with silicone or a similar temperature resistant, smooth and washable material.

To prevent rotation, the probe is preferably connected to cavity 10 through an anti rotation male and female fixture which help to maintain the probe in a correct position.

The probe can have either a single temperature sensing point or multiple sensing points distributed along the sensing portion or needle.

Figure 2:
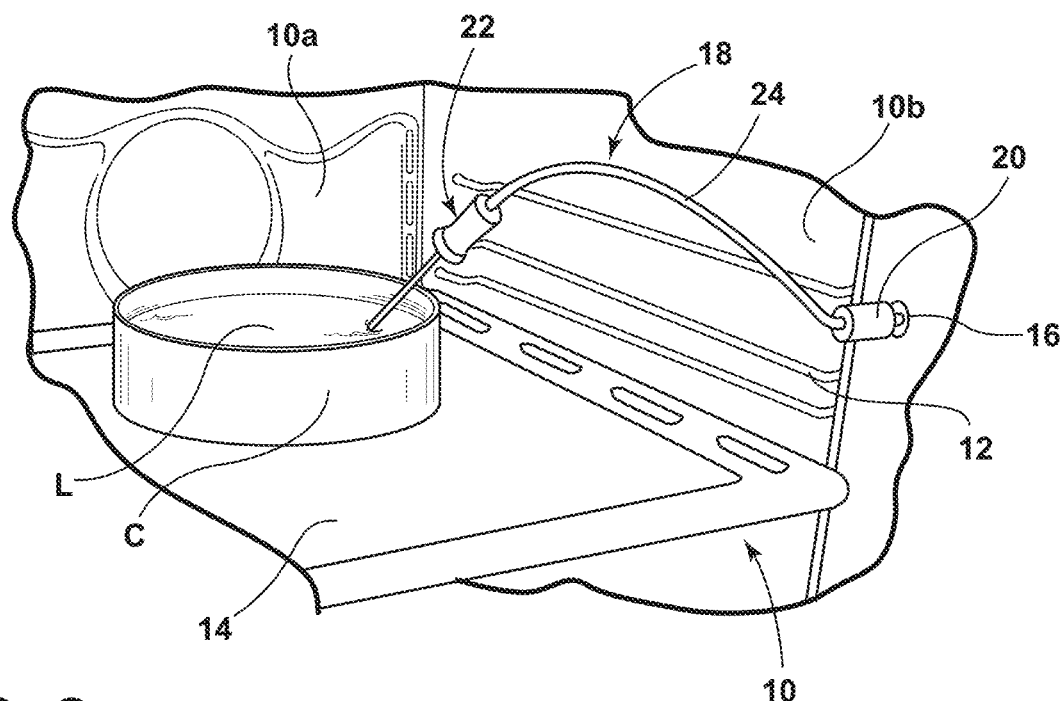
FIG. 2 is a perspective view similar to FIG. 1 in which the temperature probe is used for a different kind of foodstuff (liquid)

Referring to FIGS. 1-2, a domestic oven comprises a cavity 10 with a rear wall 10a and side walls 10b. Side walls 10b are provided with racks 12 for supporting metal shelves 14 or grid. One of the side walls 10b, adjacent the front opening of the cavity 10, is provided with an electric socket 16 for the mechanical and electrical connection of a temperature probe 18 comprising a connector 20 to be inserted into the socket, a sensing portion 22 to be inserted in the food B or L and a semi-rigid cable 24 which is self supporting and which is generally known in other technical fields such as desk lamps, oil dispensers, phone chargers etc.

Referring now to FIG. 3, in some embodiments the semi-rigid cable 24 comprises a core 26 made of flexible plastic material having resistance to heat (for instance silicone rubber) embedding electrical conductive wires 28 and surrounded by a metallic semi-rigid sheath 30 coated by a silicone layer 32.

Referring now to FIG. 4, in some embodiments the semi-rigid cable 24 comprises a central metal core 34 which is semi-rigid and is embedded in an insulation flexible structure 36 (for instance made of silicone rubber), electrical conductive wires 28 may also be embedded in such structure. The number of wires 28 can be different from what is shown in FIGS. 3 and 4, and can depend on how the sensing portion 22 is designed (single temperature sensor or multiple temperature sensor).

According to some embodiments, the semi-rigid cable 24 possesses enough stiffness to keep the sensing portion 22 in its intended position even when subjected to the bare force of gravity (i.e. when the food does not offer any counteracting force). That is, the semi-rigid cable 24 possesses enough stiffness to overcome Earth's gravitational force upon the sensing portion.

The composition of the semi-rigid cable 24 can be different or varied from what is explained above.

Referring now to FIG. 5, to avoid any unwanted rotation of the probe 18 relative to the socket 16, the connector 20 and the socket 16 are respectively provided with crown-shaped elements 16a and 20a or any other mechanical feature designed to prevent the rotation of the connector around its axis which are mechanically engaged and which are maintained in such engagement condition by means of magnets or equivalent means, for instance snap-engaging devices (not shown). The crown-shaped elements 20a of the connector 20 include spaced projections 50 extending generally parallel to the cable and in a direction away from the semi-rigid cable 24. The crown-shaped elements 16a of the socket 16 include spaced recesses 52 to receive the spaced projections 50 of the connector 20. The spaced projections 50 in the spaced recesses 52 prevent rotation of the semi-rigid cable 24. Thanks to this feature even when the food product is a liquid (a soup or the like as in FIG. 2) placed in a container C, the probe 18 maintains the initial position decided by the user.

Referring now to FIG. 6, in some embodiments the probe 18 may have the connector 21 with a prismatic shape corresponding to the shape of a socket 17 having a quadrangular aperture 17a. In such embodiments, as other possible ones, the shape of the connector 21 may prevent the rotation of the connector 21 around its axis.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A temperature probe for a domestic oven, the temperature probe comprising:
   a sensing portion for inserting into food during cooking; and
   a cable for coupling the sensing portion to the domestic oven, the cable possessing enough stiffness to maintain the sensing portion in a set position, the cable comprising an insulation polymeric matrix, at least one semi-rigid, plastically-deformable metal core embedded in the insulation polymeric matrix, and electrical wires embedded in the insulation polymeric matrix.

2. The temperature probe of claim 1, wherein the cable further comprises a metallic flexible sheath enclosing the insulation polymeric matrix.

3. The temperature probe of claim 2, wherein the cable further comprises a silicone layer coated over the metallic flexible sheath.

4. The temperature probe of claim 1, wherein the cable further comprises a connector configured to be received by a socket provided at a wall of the domestic oven and electrically connect the sensing portion to the domestic oven.

5. The temperature probe of claim 1 further comprising a connector connected to the cable, the connector comprising spaced projections extending generally parallel to the cable and in a direction away from the cable, the spaced projections configured to be received by spaced recesses of a socket provided at a wall of the domestic oven, the spaced projections and spaced recesses preventing rotation of the cable.

6. The temperature probe of claim 1 further comprising a connector connected to the cable, the connector having a prismatic shape, the prismatic shape configured to be received by an aperture of a socket provided at a wall of the domestic oven, the prismatic shape and the aperture preventing rotation of the cable.

7. A domestic oven comprising:
  a control unit; and
  a temperature probe comprising:
    a sensing portion for inserting into food during cooking; and
    a cable coupling the sensing portion to the control unit, the cable possessing enough stiffness to maintain the sensing portion in a set position, the cable comprising an insulation polymeric matrix, at least one semi-rigid, plastically-deformable metal core embedded in the insulation polymeric matrix, and electrical wires embedded in the insulation polymeric matrix.

8. The domestic oven of claim 7 further comprising:
  walls defining a cavity; and
  a socket provided at one of the walls of the cavity;
  wherein the temperature probe further comprises a connector connected to the cable and inserted into the socket thereby electrically connecting the sensing portion of the temperature probe to the control unit.

9. The domestic oven of claim 8, wherein the connector comprises spaced projections extending generally parallel to the cable and in a direction away from the cable; and
  wherein the socket comprises spaced recesses receiving the spaced projections of the connector thereby preventing rotation of the cable.

10. The domestic oven of claim 8,
  wherein the socket comprises an aperture; and
  wherein the connector has a prismatic shape corresponding to the aperture of the socket and thereby preventing rotation of the cable.

11. The domestic oven of claim 8, wherein the cable further comprises a metallic flexible sheath enclosing the insulation polymeric matrix.

12. The domestic oven of claim 11, wherein the cable further comprises a silicone layer coated over the metallic flexible sheath.

13. A method of sensing food temperature in an oven comprising:
  inserting a sensing portion of a temperature probe into food contained within a container positioned in an oven, the sensing portion taking an inserted position, the oven comprising a control unit; and
  the temperature probe further comprising a cable possessing enough stiffness to maintain the sensing portion in the inserted position, the cable comprising an insulation polymeric matrix, at least one semi-rigid, plastically-deformable metal core embedded in the insulation polymeric matrix, and electrical wires embedded in the insulation polymeric matrix.

14. The method of claim 13 further comprising:
  coupling a connector connected to the cable of the temperature probe to a socket at a wall of the oven, thereby electrically connecting the sensing portion of the temperature probe to the control unit.

15. The method of claim 13, wherein the cable further comprises a metallic flexible sheath enclosing the insulation polymeric matrix, and a silicone layer coated over the metallic flexible sheath.

16. The method of claim 13, wherein the food is a soup.

17. The method of claim 14, wherein the connector comprises spaced projections extending generally parallel to the cable and in a direction away from the cable; and
  wherein the socket comprises spaced recesses receiving the spaced projections of the connector thereby preventing rotation of the cable.

* * * * *